United States Patent Office 3,725,152
Patented Apr. 3, 1973

3,725,152
POLYMERIC BINDERS FOR USE IN HYBRID
ROCKET PROPELLENTS
Earl T. Niles, Midland, and Don L. Stevens, Sanford,
Mich., assignors to The Dow Chemical Company, Midland, Mich.
No Drawing. Filed May 3, 1971, Ser. No. 139,821
Int. Cl. C06d 5/10
U.S. Cl. 149—19     6 Claims

ABSTRACT OF THE DISCLOSURE

Disclosed is a novel binder system suitable for use in a hybrid rocket propellent. The binder involves the copolymeric reaction product of a polyethylene imine and an epoxy terminated polypropylene oxide. The amine hydrogen/epoxide functionality ratio is sufficiently high to provide a polymer rich in nitrogen.

BACKGROUND OF THE INVENTION

Hybrid rocket motors are composed of a combustion chamber containing a solid fuel grain to which a liquid or gaseous oxidizer is pumped. A polymeric material which can be pour cast into the chamber and will readily decompose when contacted with the oxidizer is desirable for such a motor. In preparing a hybrid rocket motor a particulate fuel, e.g. aluminum, is mixed with a fluid prepolymer/curing agent combination and this mixture is poured into the combustion chamber. The prepolymer is then cured to form a solid grain with fuel particles uniformly dispersed therein.

In order to perform satisfactorily as a solid fuel binder, a polymeric composition must meet several criteria. First of all the prepolymer/curing agent combination must have sufficient viscosity to maintain the fuel particles in suspension during the curing step. However, the mixture of uncured polymer and fuel should not be of such high viscosity that it cannot be pour cast. Additionally the fully cured composition should provide a tough elastomeric material having satisfactory properties throughout a wide range of temperatures. This is the case since a tactical missile is subjected to severe temperature changes during a relatively brief period of time. The fuel must be flexible at low temperature or it will break up during ignition of the motor. A satisfactory solid fuel grain should have a minimum elongation of 8% at −40° C. Another important factor in selecting a polymeric binder system is its "pot life." The term "pot life" refers to the time during which the prepolymer/curing agent combination remains fluid. In general, at least two hours of fluidity is needed in order to properly mix the formulation and cast the motor. Another criterion for utility in a hybrid rocket propellent is that the binder be rich in nitrogen. Increased efficiency of a hybrid propellent is obtained by its having a high nitrogen content which reduces the regression rate of the propellent fuel grain during combustion.

It is an object of the present invention to provide a novel polymeric composition.

An additional object is to provide such a composition which demonstrates an elongation of at least 8% at −40° C.

An additional object is to provide such a composition which is prepared by mixing liquid reactants which can be cured to a coherent grain, but maintain their fluidity for at least about two hours.

A further object is to provide such a composition which before curing has sufficiently high viscosity to maintain particulate fuel particles suspended therein yet has a sufficiently low viscosity to provide a pour castable composition when mixed with a particulate fuel.

SUMMARY OF THE INVENTION

The present invention is the polymeric reaction product of an epoxide terminated polypropylene oxide having a molecular weight of from 300 to 1000 with a polyethylene imine having a molecular weight of from about 1000 to about 2000. The polypropylene oxide has an epoxide functionality of at least about 1.5 and the amine hydrogen/epoxide functionality ratio is within the range of from 15:1 to 30:1.

DETAILED DESCRIPTION

The polyethylene imine employed as prepolymer in the present invention has an average molecular weight of from about 1000 to 2000 and preferably from about 1200 to 1800. Those polyethylene imines having intact aziridine rings described by Symm et al. in U.S. Pat. 3,492,289 or those not containing such rings described by Jones in "Polymerization of Olefin Imines" are equally suitable. Those epoxy terminated polypropylene oxides having an average molecular weight within the range of from 610 to 670 are preferred. Epoxides having a functionality of 2 are most desirable; a functionality of 2.5 works well and those having a functionality as low as about 1.5 are operable.

The prepolymer and curing agent are liquid within the specified molecular weight ranges. If the molecular weights are too high the resulting composition becomes too viscous to be pour cast. If the molecular weight is too low the uncured composition will not be viscous enough to maintain fuel particles in homogeneous suspension during curing.

The amine hydrogen/epoxide functionality ratio may range from 15:1 to 30:1 with a ratio of about 20:1 being preferred. These high ratios provide a polymer having a greater nitrogen content than known copolymers of polyethylene imine and epoxides. The amine hydrogen numerator of the above ratio is the average number of gram molecular weights of amine hydrogen present per gram molecular weight of polyethylene imine employed. This figure can readily be determined by dividing the number of grams of polymer employed by 43.

The above described reaction product has been found to be an excellent binder fuel for use in a hybrid rocket motor. The propellant composition is prepared by mixing a fuel with the uncured binder and curing the combination. Normally the mixture of prepolymer, curing agent and fuel is pour cast into the motor casing where it is cured.

Fuel components which are combined with the binder system to form a hybrid solid propellant include aluminum, beryllium and magneisum, lithium, boron and alloys thereof. Metallic hydrides such as aluminum hydride, beryllium hydride, lithium hydride, magnesium hydride and the boron hydrides are also useful as fuels. The fuels are employed in particulate form. Particles having their longest dimensions within the range of from $2\mu$ to $500\mu$ may be used with spherical particles having diameters of from $4\mu$ to $60\mu$ microns being preferred. The amount of polymer employed in such a propellant is normally that which provides a composition containing from 10 to about 50% binder.

The invention is further illustrated by the following examples.

Example I

A liquid polyethylene imine having an average molecular weight of about 1800 was combined with a diepoxide terminated polypropylene oxide having an average molecular weight of about 640. The PEI was employed in the amount of 43.0 grams and the epoxide in the amount of 16.0 grams providing an amine hydrogen/epoxide functionality ratio of about 20:1. After thorough mixing the combination was cured at 80° C. for 24 hours. The resulting polymer which was in the form of a tough rubber-like grain had a nitrogen content of 23.76%.

Before curing, the formulation was of a sufficiently low viscosity to be pour cast. This viscosity did not show signs of significant increase for 2 hours indicating a satisfactory pot life.

Elongation tests run on Joint Army, Navy, Air Force (JANAF) test bars indicated elongation of 25% at −40° C.

Example II

Several formulations were prepared in accordance with the present invention. Atomized aluminum (4–60μ in diameter) was incorporated into the polymeric binder system as fuel. Polyethylene imine having an average molecular weight of about 1200 (PEI–12) and about 1800 (PEI–18) was employed. The epoxy terminated polypropylene oxide of Example I (EPPO) was employed as curing agent. A high nitrogen containing reaction product of formaldehyde and hydrazine (TFTA) was employed in one formulation as a source of additional nitrogen. The compositions of these formulations are set out in Table I.

TABLE I

| Formulation | Percent ingredient | | | | | |
|---|---|---|---|---|---|---|
| | 1 | 2 | 3 | 4 | 5 | 6 |
| Ingredient: | | | | | | |
| PEI-12 | | | 21.88 | | 29.15 | |
| PEI-18 | 29.15 | 43.75 | | 36.45 | | 26.27 |
| EPPO | 10.85 | 16.25 | 8.12 | 13.55 | 10.85 | 9.77 |
| Aluminum | 60.00 | 40.00 | 70.00 | 50.00 | 60.00 | 30.00 |
| TFTA | | | | | | 33.96 |

In order to obtain JANAF test bars, binder ingredients were mixed for 10 minutes at room temperature and the atomized aluminum added with 20 minutes of additional mixing before casting into a JANAF tensile bar mold. The samples were then cured 24 hours at 80° C. The cured samples were then cooled, removed from the mold and cut to a thickness of 0.15″. Formulations 1, 2, and 3 were tested for tensile strength and elongation at −40° C. and at room temperature. The results of these tests are set out in Table II.

TABLE II.—PROPERTIES OF JANAF TEST BARS

| | Room temp. properties | | −40° C. properties | |
|---|---|---|---|---|
| | Tensile strength, lbs./sq. in. | Percent elongation | Tensile strength, lbs./sq. in. | Percent elongation |
| 1 | 142 | 13.5 | 2,270 | 22.4 |
| 2 | 112 | 17.9 | 2,700 | 32.1 |
| 3 | 105 | 11.9 | 2,000 | 17.2 |

Example III

Motor cases were obtained which were 12″ long and had an inner diameter of 2.375″. The motors cast into these cases were the central internal burning type with a 1.55″ I.D. Formulation 1 (Table III) was prepared by mixing the prepolymer and curing agent for 5 minutes in a one gallon Baker Perkins mixer, and adding the aluminum with additional mixing for 20 minutes. The motors were then cast and cured for 24 hours at 80° C.

Due to the TFTA in the formulation, the second propellant was mixed differently. In preparing this formulation, the TFTA, aluminum and PEI–18 were added to the mixer simultaneously and mixed at room temperature under 4 mm. pressure. After 1 hour of mixing EPPO was added and the sample mixed an additional 10 minutes. The formulation was then cast in the motor and cured for 24 hours at 80° C. The formulaitons of the motors thus prepared are set out in Table III.

TABLE III.—FORMULATIONS OF HYBRID MOTORS

| | Percent ingredients | |
|---|---|---|
| Formulation | 1 | 2 |
| Ingredients: | | |
| PEI-18 | 43.75 | 26.27 |
| EPPO | 16.25 | 9.77 |
| Aluminum | 40.00 | 30.00 |
| TFTA | | 33.96 |

Table IV sets out the theoretical elemental analysis of the formulations prepared as set out in Example III.

TABLE IV.—THEORETICAL ELEMENTAL ANALYSIS OF FORMULATIONS OF EXAMPLE III

| | Composition, percent | |
|---|---|---|
| Formulation | 1 | 2 |
| Element: | | |
| C | 34.68 | 32.15 |
| H | 6.49 | 6.75 |
| O | 4.50 | 2.71 |
| N | 14.33 | [1] 28.42 |
| Al | 40.00 | 30.00 |

[1] The formulation was brought to above 28% nitrogen content by the addition of only 33.96% TFTA. This is contrasted with conventional hybrid rocket propellents which employ polymethylmethacrylate or polybutadiene as binder and require 50% TFTA to achieve a 28% nitrogen level.

We claim:
1. A propellant composition suitable for use in a hybrid rocket motor which comprises from 10 to about 50 weight percent of the polymeric reaction product of an epoxide terminated polypropylene oxide having a molecular weight of from 300 to 1000 and a functionality of at least about 1.5 with a polyethylene imine having a molecular weight of from about 1000 to about 2000 wherein the amine hydrogen/epoxide functionality ratio is within the range of from 15:1 to 30:1 in combination with a fuel.

2. The propellant composition of claim 1 wherein the fuel is particulate aluminum, beryllium, magnesium, lithium, boron or an alloy thereof.

3. The propellant of claim 1 wherein the fuel particles have their longest dimension within the range of from 2μ to 500μ.

4. The propellant of claim 1 wherein the fuel particles are spherical and have diameters within the range of from 4μ to 60μ.

5. The propellant composition of claim 4 wherein the fuel is aluminum.

6. The propellant composition of claim 1 wherein a reaction product of formaldehyde and hydrazine is employed to increase the nitrogen content.

References Cited
UNITED STATES PATENTS

| 3,257,802 | 6/1966 | Kaufman | 149—2 |
| 3,376,175 | 4/1968 | Sheeline | 149—19 |
| 3,392,528 | 7/1968 | Moutet et al. | 149—19 |
| 3,401,156 | 9/1968 | Lovett et al. | 260—89.7 |
| 3,454,436 | 7/1969 | Bedell | 149—19 |
| 3,476,622 | 11/1969 | Harada et al. | 149—19 |
| 3,567,530 | 3/1971 | Lait et al. | 149—19 |

CARL D. QUARFORTH, Primary Examiner

E. A. MILLER, Assistant Examiner

U.S. Cl. X.R.
149—22, 36, 114